Feb. 20, 1962 R. E. WADE 3,021,933
SEED DISTRIBUTING SHOE
Filed Feb. 24, 1960
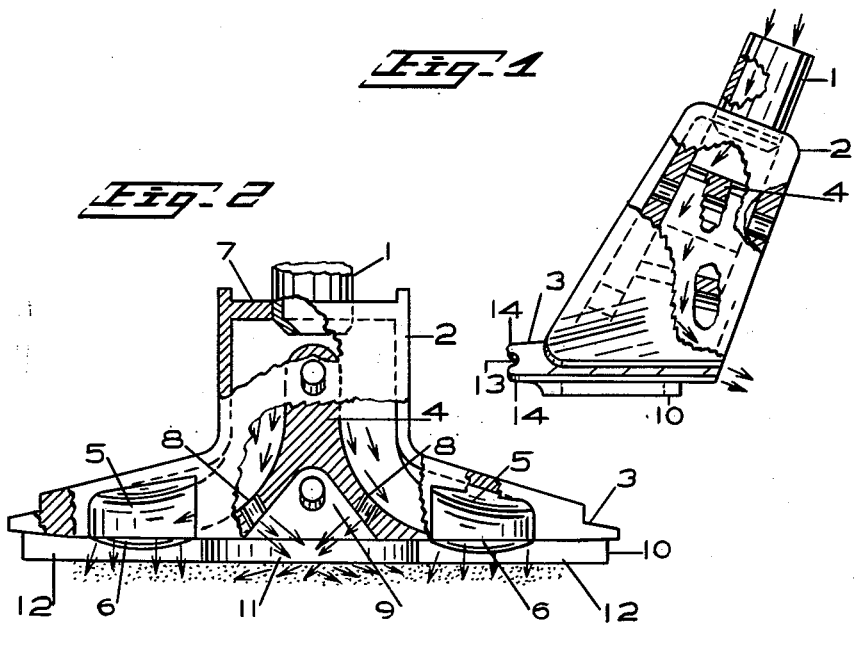
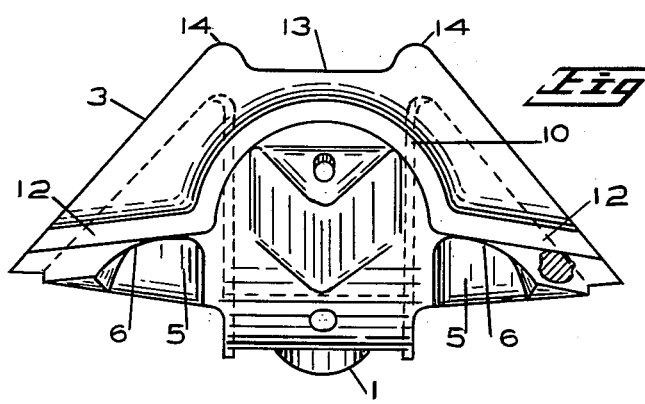
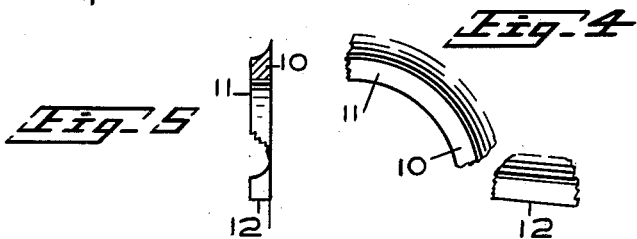

United States Patent Office 3,021,933
Patented Feb. 20, 1962

3,021,933
SEED DISTRIBUTING SHOE
Robert Edgar Wade, Consort, Alberta, Canada
Filed Feb. 24, 1960, Ser. No. 10,703
2 Claims. (Cl. 193—9)

This invention relates to seed distributing shoes of a character as set out in United States patent granted to me November 17, 1959, under Number 2,913,086.

In the above patent a shoe was disclosed having a base with upstanding column carrying a seed inlet tube discharging onto a saddle that directed the seed into passages for discharge through cored outlets.

The present invention is directed to improvement in the above mentioned shoe, these improvements including a change in the shape of the shoe base and the addition of a curved ridge on the under side of the base for use in gumbo and sticky bottom land, which has a tendency to spring up and cause plugging of the seed outlets, this ridge serving to compress and plow off to the side the soil that otherwise would spring up.

The improvement also includes the addition in the lower part of the saddle of inwardly directed outlets from the diverging passages, by which seed is distributed over the space between the seed rows fed from the cored outlets giving a broadcast across the interval between these outlets without interfering with the side hill advantages as set out in the previously granted patent. These center outlets are also protected by the ridge of the improved base plate.

The improved shape of the shoe point with the added ridge considerably strengthens the base, offering protection against breakage in making as occurs in the former shoe, and also adapts it for fitting to larger shanks.

Also, the seed inlet tube for the shoe, which was formerly set in a plate attached to the upper end of the shoe, is now fitted directly into the body of the shoe column, welded therein, eliminating the attaching plate.

In the drawings, illustrating a preferred embodiment of the invention,

FIG. 1 is a side view of a shoe as set out in the above mentioned patent and including my improvements, the shoe and seed inlet tube being shown broken away in part and in part vertically sectioned.

FIG. 2 is a rear view of the shoe, with the direction of travel of seed fed through the shoe indicated by arrows, and with the shoe and seed inlet tube shown in part broken away and in part vertically sectioned.

FIG. 3 is an inverted plan view of the shoe.

FIG. 4 shows an inverted plan view of fragments of the ridge portions of the shoe.

FIG. 5 is a side view of the ridge portions of the shoe taken on a line 5—5 of FIGURE 4.

Having reference to the drawings the shoe, as set out in my previously mentioned patent, comprises a grain inlet tube 1 mounted in a column 2 on a base 3, the column having diverging passages 3' separated by a saddle portion 4, the passages delivering to cored outlets 5 that discharge over recessed ledges 6.

In the present showing the column 1 is formed with an integral top portion 7 in which the seed tube 1 is fixed, as by welding.

In addition the lower portion of the saddle 4 is formed with inwardly directed outlets 8 discharging into a cavity 9 in the shoe structure below the saddle, this seed spreading over that portion of the furrow traversed by the shoe between the rows seeded by the outlets 5 to give a broadcast over the complete width of the outlets 5 and intervening area.

For protection of the seed outlets from plugging by soil through which the shoe passes, and more particularly adapt the shoe for use on gumbo or sticky soil, the base 3 of the shoe is formed on the under side with a ridge 10, this ridge curving around the lower part of the saddle, as at 11, and extending laterally in advance of the delivery ledges 6, as at 12. This ridge forms a a support or wear plate for travel of the shoe, compressing and plowing off to the sides the soil that normally would spring up into the outlets. This protects both the side outlets delivering over the ledges 6 and the center outlets as herein added.

For giving greater strength to the shoe, and particularly as a protection against breakage in making the shoe, the toe of the shoe is truncated, as at 13 and formed with spaced forwardly projecting points 14 in advance of the side outlets, the base along with the ridge 10 plowing off the soil and forming a protected bed in which the seed is deposited.

In the use of the device, seed discharging down the passages 3' is scattered by the cored outlets 5 and discharged over the ledges 6, and at the same time seed is discharging through the inwardly directed outlets 8.

This arrangement gives a full broadcast of seed between the outer ends of the outlets 5. The seeded area is protected by the ridge 10 which plows off the soil that might otherwise plug up the seed outlets.

Having thus particularly described and ascertained the nature of my said invention, what I claim and wish to secure by Letters Patent is:

1. A seed distributing shoe having a base and a column on the base with center saddle portion and diverging passages through which seed passes to cored outlets for discharge over recessed ledges in which the lower part of the saddle portion of the shoe is formed with inwardly directed seed outlets leading from the diverging passages, said saddle portion having a cavity forming a rearward outlet through which seed passing through the inwardly directed outlets discharges, and including an integral ridge on the under side of the shoe forming a support on which the shoe travels, said ridge including a center curved portion in advance of the cavity into which the inwardly directed outlets discharge and side portions extending from the center portion laterally in advance of the cored outlets.

2. A seed distributing shoe as set out in claim 1 in which the base of the shoe is formed with a truncated portion in front of the curved center portion of the ridge and a forwardly directed point projecting in advance of each of the cored outlets.

References Cited in the file of this patent
UNITED STATES PATENTS
2,913,086    Wade _____ Nov. 17, 1959
FOREIGN PATENTS
121,927    Germany _____ Nov. 9, 1899